United States Patent [19]
Revels

[11] Patent Number: 5,913,466
[45] Date of Patent: Jun. 22, 1999

[54] UNIVERSAL COOLER BRACKET FOR BICYCLES

[76] Inventor: Harry Revels, 3873 S. Banana River Blvd., No. 205, Cocoa Beach, Fla. 32931

[21] Appl. No.: 08/955,681
[22] Filed: Oct. 22, 1997
[51] Int. Cl.⁶ ........................................ B62J 7/06
[52] U.S. Cl. ..................... 224/421; 224/435; 224/445; 224/463
[58] Field of Search .............. 248/219.1, 205.2, 248/214, 219.4, 227.4; 224/420, 428, 431, 433, 435, 445, 446, 463, 41.3, 421

[56] References Cited

U.S. PATENT DOCUMENTS

| | | |
|---|---|---|
| 4,697,725 | 10/1987 | Miree ............................ 224/463 |
| 5,024,359 | 6/1991 | Thomas . |
| 5,282,554 | 2/1994 | Thomas . |
| 5,406,816 | 4/1995 | Thomas . |
| 5,423,509 | 6/1995 | LaPorte et al. ..................... 224/420 |

Primary Examiner—Ramon O. Ramirez
Assistant Examiner—Willie Berry, Jr.
Attorney, Agent, or Firm—McHale & Slavin

[57] ABSTRACT

A mounting bracket for attaching a cooler to an intersection of a handlebar and head tube of a bicycle. The mounting bracket is secured to a cooler and employs flexible straps to adjustably attach the bracket to the bicycle handlebar and head tube. The bracket is substantially T-shaped and includes a handlebar-engaging portion having stabilizing tabs with angled cutouts that accommodate handlebars of various diameter. A head tube-engaging portion includes an adjustable spacing foot that positions the bracket with respect to the bicycle head tube.

10 Claims, 3 Drawing Sheets

UNIVERSAL COOLER BRACKET FOR BICYCLES

FIELD OF THE INVENTION

This invention relates to bicycle-mounted carriers, and more particularly to a universal bracket that permits attachment of most any type of cooler to a bicycle handle.

BACKGROUND OF THE INVENTION

Bicycles are commonly used as a basic form of transportation, recreation and/or exercise for a single rider. The bicycle can also be used to carry items for the convenience of the rider. For this reason, numerous devices exist for the purpose of enhancing the load-carrying capacities of bicycles. For example, luggage racks and cargo baskets allow the rider to keep their hands available for driving of the bicycle. However, while these devices allow a bicycle rider to carry cargo, they often require a myriad of cables and tie-downs for securement, especially if cargo includes loose items.

Some cargo carriers are self-contained and do not require extra tiedowns for cargo securement. For example, bags and packs modified with straps or clips may be attached to bicycles and used to transport goods. Typically, these carriers are removable from a bicycle and may be easily transferred from one bicycle to another. These carriers typically dangle below a portion of the bicycle frame or hang from the bicycle seat. As a result, although self-contained bags and packs may be attached to a wide variety of bicycles, they are not suitable for carrying large or bulky loads.

Other types of carriers include rigid containers capable of holding heavy bulky items. In particular, a number of inventions are directed to coolers attached to the handlebar area of a bicycle. The use of a cooler allows a rider to carry cold drinks, food and snacks. For instance, U.S. Pat. No. 5,024,359 discloses a bicycle cooler that is adapted for mounting to the handlebar portion of a bicycle. This cooler has a bracket formed integral with the cooler making the manufacturing process unique to this type of attachment.

U.S. Pat. No. 5,282,554 discloses a cooler and mounting bracket for attachment to a bicycle. The cooler claimed in this patent employs a two-piece bracket, wherein one piece is secured to a side surface of the cooler and detachably couples with a corresponding second piece that is mounted on the bicycle handlebar portion. The mounting bracket includes a retention slot for receipt of the bracket secured to the cooler. The cooler can then be removed from the bicycle without removal of the mounting bracket from the bicycle. U.S. Pat. No. 5,406,816 discloses an improvement to the aforementioned invention. The improvement includes the use of various types of containers that can be attached to the two-piece bracket. While these devices set forth a particular type of cooler attachment, they fail to address the various types of coolers that the public may choose to use as well as the large variety of bicycles that may employ such a product.

For this reason, while a particular cooler attachment may address the relative position between a handlebar and head tube, no teaching is made which addresses the variety of handlebar and head tube diameters that exist in today's bicycle designs, or the cabling for brakes and gears that may not allow for an inflexible attachment. For example, many mountain bikes are built with oversized tubing to provide high-strength, low-weight frames. Rigid-container carriers do not provide attachment hardware that will adequately fit this type of bicycle frame. Unfortunately, simply providing large-diameter attachment members is not an effective approach: most on-road bikes do not have oversized tubing and oversized attachment members would, in turn, not properly fit these bikes. To complicate matters even further, many different bicycles for each type of terrain; these riders would need separate mounting hardware for each type of bike.

Even single-bike owners present difficulties for most rigid-container carriers, because the known devices do not address the versatile nature of today's bicycles. For example, depending upon the intended travel surface or weather conditions, bicycle riders may customize a single bicycle with a variety of equipment. Much of this equipment is handlebar-mounted. For example, many riders place an overwrap or grip tape on their bicycle handlebars to increase control in wet or cold conditions. Some riders also mount safety horns or travel computers, which often have associated wires on their bicycle handlebars. The design of known rigid container mounts severely limits a rider's ability to use handlebar-mounted enhancements or equipment. Using or removing this type of equipment changes the handlebar size of a given bicycle, and changing the diameter of the handlebar from a preset size requires new attachment hardware. As a result, even a single bicycle with non-oversized tubing may sometimes require separate sets of attachment hardware. Furthermore, depending upon the type of equipment used, an appropriate set may not exist.

Finally, there are a number of coolers on the market that a particular rider may appreciate for his usage. For instance, a cooler having a rotatable top would be most beneficial to rider who prefers to access the contents of the cooler without stopping to handle the lid.

Thus, what is needed is a universal mounting bracket that allows the consumer the ability to mount any type of cooler and accommodate frame tubing of various sizes for ease of attachment and removal. The mounting bracket providing sufficient flexibility to allow operation of gear-control and hand brake cables and be movable between bicycles with minimal adjustment.

SUMMARY OF THE INVENTION

The present invention is a universal mounting bracket for selectively attaching a cooler to the intersection of the handlebar and head tube of a bicycle. The frame mounting bracket employs a plate with a handlebar-engaging portion and a head tube-engaging portion. A securement bracket connects the bracket to a cooler. In turn, flexible tethering straps disposed in attachment slots extending from the mounting plate secure the bracket to the bicycle handlebar and head tube. The flexible tethering straps have resealable fasteners and are adjustable in length.

Handlebar-abutting stabilizing tabs and a head tube-abutting spacing foot extend from the mounting plate and have angled cutouts that accommodate bicycle frame members of various diameters. The stabilizing tabs and spacing foot cooperate with the tethering straps to provide a customized, secure attachment of the bracket and cooler to the bicycle.

Thus, it is an object of the present invention to teach a universal bicycle bracket that can be attached to a cooler allowing the cooler to be mounted to the handlebars and head tubes of various dimensions.

It is a further object of the present invention to teach a removable, bicycle-mounted cooler and bracket combination that is adjustable, allowing mounting and removal of handlebar-mounted equipment.

It is yet a further object of the present invention to teach a removable, bicycle-mounted cooler and bracket combination that allows effective operation of gear-control and hand brake cables.

It is still a further object of the present invention to teach a removable, bicycle-mounted cooler and bracket combination that is movable between same-sized or different-sized bicycles without undue adjustment.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
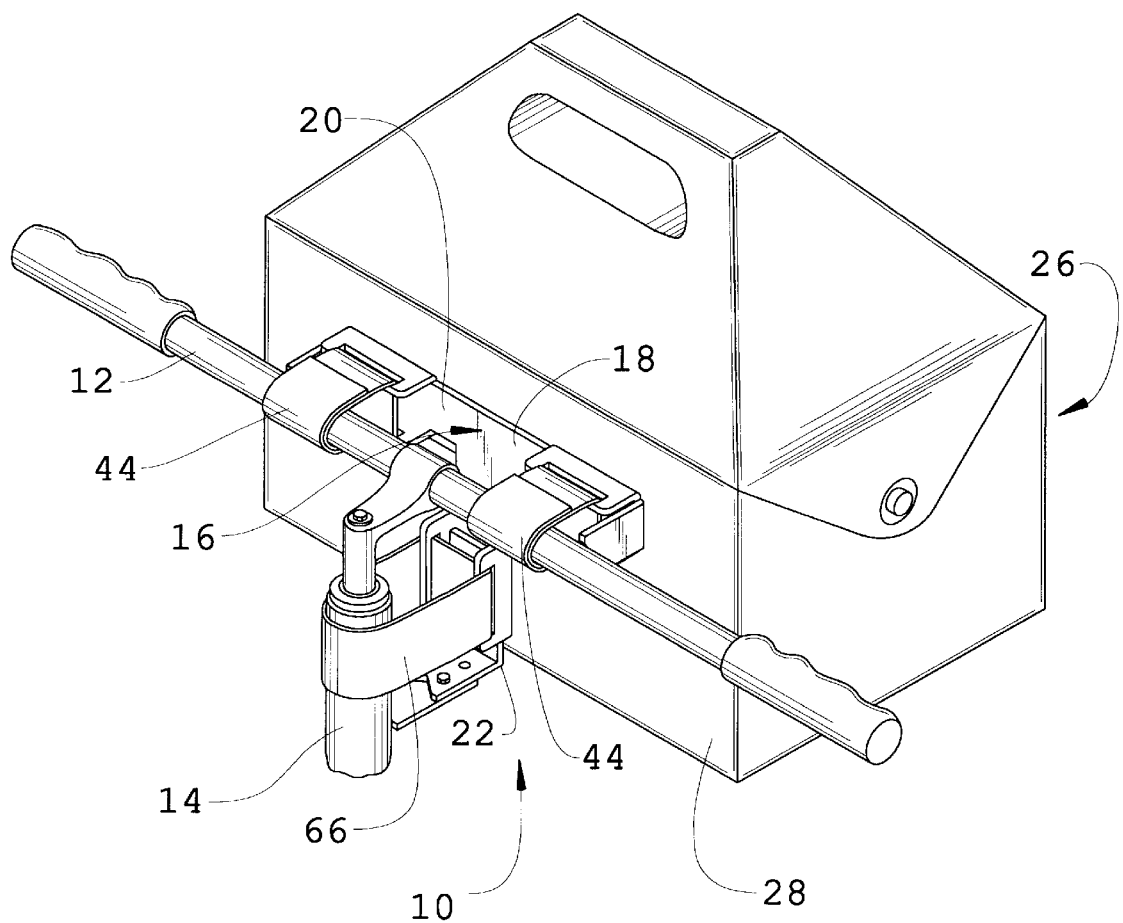
FIG. 1 is a pictorial view of the cooler and bicycle mounting bracket combination of the present invention in use on a bicycle.

Now with reference to FIG. 1, a cooler and mounting bracket combination 10 is shown. The bracket 16 is secured to a cooler of the individual's choosing and the bracket can then be attached to the intersection of a handlebar 12 and head tube 14 of a bicycle. The bracket 16 includes a substantially-T-shaped mounting plate 18 that is characterized by a handlebar-engaging portion 20 and a head tube-engaging portion 22. The handlebar-engaging portion 20 and head tube-engaging portion 22 are co-planar, yet oriented perpendicular to each other. The cooler 26 illustrated is well known in the industry having a lockable but rotatable top lid to prevent loss. To access the contents of the cooler, the side mounted lock buttons are depressed allowing the lid to rotate clear of the top allowing access to the contents of the cooler.

Figure 2:
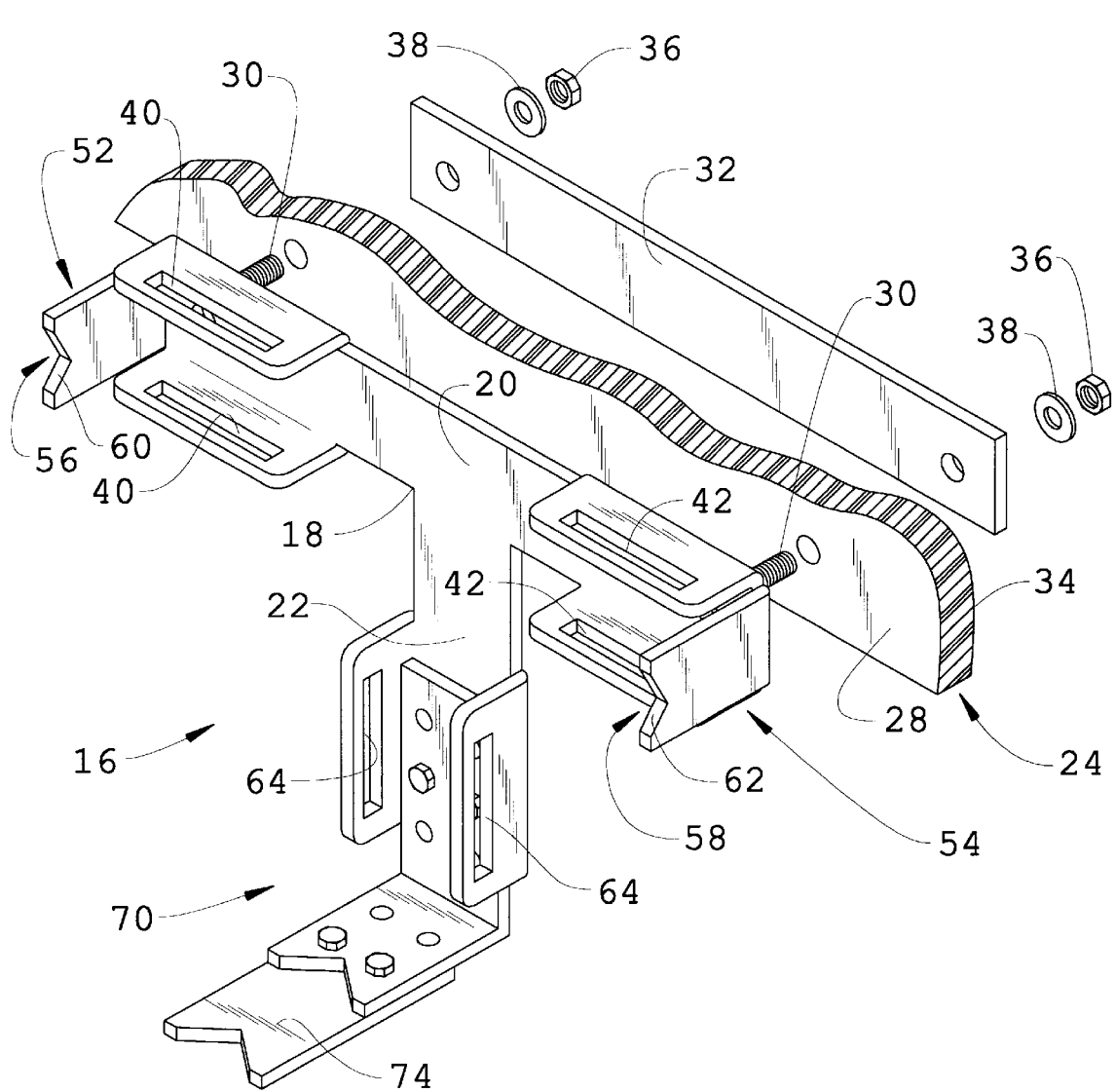
FIG. 2 is a close-up, perspective view showing how the mounting bracket of the present invention attaches to a cooler wall.
Figure 3:
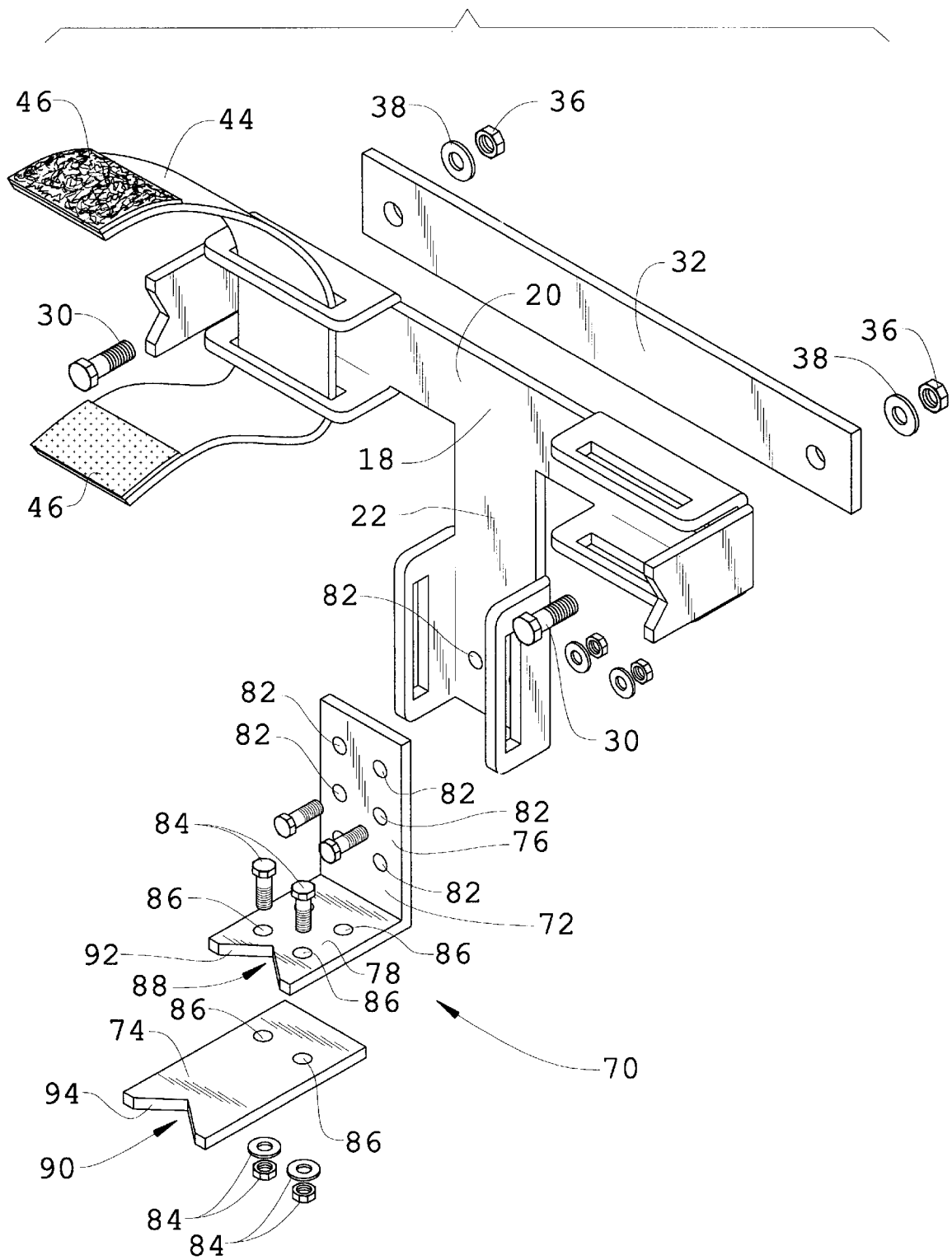
FIG. 3 is an exploded, perspective view of the mounting bracket illustrated in FIG. 2.

Now referring to FIGS. 2 and 3, the mounting plate 18 is a substantially-flat component which abuts a side wall 24, shown as a partial view, of a conventional cooler. The mounting plate 18 is secured against an outside surface 28 of the wall 24 by the use of bolts 30 that extend through the mounting plate, continue past the cooler wall, and are placed through a reinforcement plate 32 which is placed along an interior surface 34 of the cooler. Nuts 36 and washers 38 hold the bolts 30 in place. The result is a mounting bracket that can secure to any type of cooler having a flat side wall. In this manner, the consumer may choose the size and style of cooler that is most suitable for a particular.

The handlebar-engaging portion 20 also includes a first and second pair of strap-accepting attachment slots 40,42. Flexible tethering straps 44 occupy the attachment slots 40,42 and are designed to encircle the bicycle handlebar 12. The tethering straps 44 include hook-and-loop type fasteners 46 that allow the straps to form adjustable loops for securement of the bracket 16 to the handlebar 12. The handlebar-engaging portion 20 of the mounting plate 18 also includes a pair of stabilizing tabs 48,50 that extend, respectively, from opposite ends 52,54 thereof. Each stabilizing tab 48,50 has a notched or rounded abutment end 56,58 shaped to engage an outer surface of the bicycle handlebar 12.

In keeping with the objects of the present invention, the abutment ends are preferably characterized by angled cutouts 60,62 with straight sides. The straight sides of these cutouts 60,62 allow the stabilizing tabs 48,50 to rest securely against the handlebar 12 even if the handlebar has non-standard outer dimensions. The distance between two vertically-aligned points within a cutout 60,62 is a function of the horizontal position within the cutout. As a result, although the angle between the sides of each abutment end 56,58 is fixed, handlebars 12 of various sizes will still fit securely therein. Thus, handlebars 12 of different sizes will occupy correspondingly-different positions within the cutouts 60,62. However, the adjustable tethering straps 44 adapt to these differences and brace the handlebar 12 securely within the cutouts 60,62. Although a given handlebar 12 may only contact the cutouts 60,62 at a discrete points, the adjustable-length tethering straps 44 compensate and cooperate with the cutouts to limit the vertical and horizontal motion of the bracket 16. This arrangement even allows for equipment-caused diameter variations present in a given handlebar.

Rotational motion of the bracket around the longitudinal axis of the handlebar 12, is checked by the head tube-engaging portion 22 of the mounting bracket 16. Similar to the handlebar-engaging portion 20, the head tube-engaging portion 22 includes a pair of strap-accepting attachment slots 64. A flexible tethering strap 44, designed to encircle the head tube 14, occupies the slots 64. The flexible strap 44 includes hook-and-loop type fastening material 46 that allows the strap to form an adjustable-length band that will secure the bracket 16 to the head tube 14.

The mounting bracket 16 also includes a positioning means 70 that ensures the head tube-engaging portion 22 is properly seated against the head tube 14. The positioning means 70 includes an L-shaped spacing foot 72 and an extension tab 74 removably attached thereto. The L-shaped foot 72 has an upstanding back panel 76 disposed perpendicular to a stabilizing plank 78 formed integral therewith. Typically, the stabilizing plank 78 abuts the bicycle head tube 14 when the mounting bracket 16 is in place. However, in some bicycles, the stabilizing plank 78 does not reach the head tube 14. In these cases, the extension tab 74 is used, and the plank 78 provides an attachment platform for the extension tongue.

The spacing foot 72 is attached to the mounting bracket 16 by a pair of nut, bolt, and washer sets 80 that pass through holes 82 in the foot back panel 76 and the head tube-engaging portion 22 of the mounting plate 18. While the head tube-engaging portion has one pair of such holes 82, the foot back panel 76 has three pair of these holes. As a result, the vertical position of the foot 72 may be adjusted within the mounting bracket 16. When needed, the extension tab 74 is attached to the stabilizing plank 78 by a pair of nut, bolt, and washer sets 84. The nut, bolt, and washer sets 84 pass through holes 86 that perforate the stabilizing plank 78 and extension tab 74. After selecting an appropriate set of holes 86 or removing the tab 74 completely, the foot 72 securely engages the head tube 14.

The stabilizing plank 78 and extension tab 74 each have an abutment end 88,90 shaped to engage head tubes 22 of various sizes. The plank 78 and tab 74 abutment ends 88,90 are similar to the abutment ends 56,58 of the stabilizing tabs 48,50, described above. That is, the tab 74 and plank 78 abutment ends 88,90 both include angled cutouts 92,94. The tongue 74 and plank 78 cutouts 92,94 have straight sides similar to the cutouts 60,62 of the stabilizing tabs 48,50. As a result, the tab 74 and plank 78 cutouts 92,94 provide benefits similar to the stabilizing tab abutment ends 56,58. The angled cutouts 92,94 of the tab 74 and plank 78 cooperate with the flexible strap 44 to securely engage head tubes 22 of various size.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A bracket for removably attaching a cooler to an intersection of a handlebar and a head tube of a bicycle, said bracket comprising:

a rigid mounting plate defined by a handlebar-engaging portion having a first end spaced apart from a second end with each said end having a stabilizing tab extending therefrom and at least one attachment slot formed integral thereto, a head tube-engaging portion being centrally disposed and formed perpendicular to said handlebar-engaging portion having a stabilizing tab extending therefrom and at least one attachment slot formed integral thereto;

fastening means for securing said mounting plate to a cooler;

at least one tethering strap operatively associated with each of said slots to adjustably couple said mounting bracket to said handlebar and said head tube of a bicycle.

2. The bracket of claim 1 wherein said tethering strap is further defined as a plurality of flexible straps having a hook-and-loop type fastener for use in adjustably securing said mounting bracket to said bicycle.

3. The bracket of claim 1 wherein said handlebar-engaging portion is constructed from a substantially T-shaped single piece of material wherein said first end includes two attachment slots placed perpendicular to said first stabilizing tab and said second end includes two attachment slots placed perpendicular to said second stabilizing tab.

4. The bracket of claim 1 wherein said head tube-engaging portion is constructed from a substantially L-shaped spacing foot having a first side surface securable to said handlebar-engaging portion and a second side surface having a stabilizing tab, said first side surface adjustable securable along a longitudinal length of said handlebar-engaging portion.

5. The bracket of claim 4 including a spacing tab adjustably securable to said head L-shaped spacing foot, said spacing tab having an angled cutout for engagement to a head-tube.

6. The bracket of claim 1 wherein each said stabilizing tab includes an angled cutout to accommodate handlebars and head-tubes of various diameters.

7. The bracket of claim 1 including a reinforcement plate operatively associated with said mounting plate, said reinforcement plate positioned along an inner wall of said cooler with said fastening means coupling said handlebar portion to said reinforcement plate.

8. A bracket for removably attaching a cooler to an intersection of a handlebar and a head tube of a bicycle, said bracket comprising:

a rigid mounting plate defined by a handlebar-engaging portion having a first end spaced apart from a second end with each said end having a stabilizing tab extending therefrom and two attachment slots formed integral thereto, a head tube-engaging portion being centrally disposed and formed perpendicular to said handlebar-engaging portion, an L-shaped spacing foot having a first side surface securable to said handlebar-engaging portion and a second side surface having a stabilizing tab;

reinforcement plate operatively associated with said mounting plate;

fastening means for securing said mounting plate to said reinforcement plate with a cooler sidewall placed therebetween;

a plurality of flexible straps having a hook-and-loop type fastener for use in adjustably securing said mounting bracket to said handlebar and said head tube of a bicycle.

9. The bracket of claim 8 including a spacing tab adjustably securable to said head L-shaped spacing foot, said spacing tab having an angled cutout for engagement to a head-tube.

10. The bracket of claim 8 wherein each said stabilizing tab includes an angled cutout to accommodate handlebars and head-tubes of various diameters.

* * * * *